(No Model.) 3 Sheets—Sheet 1.
W. LEWIS.
HOLDFAST FOR DRILLING OR BORING MACHINES.
No. 512,198. Patented Jan. 2, 1894.
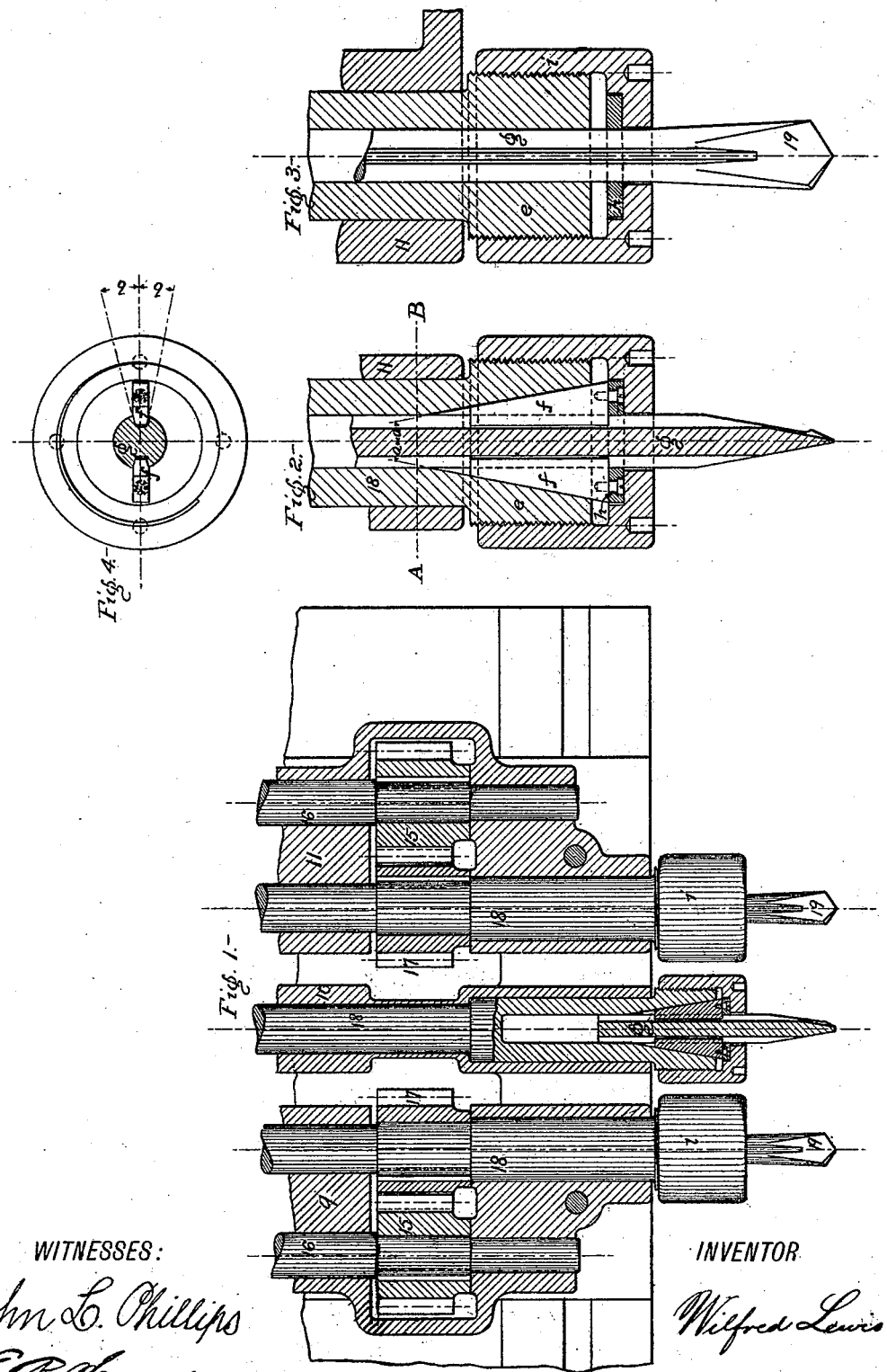
WITNESSES:
John L. Phillips
E. R. Harper
INVENTOR
Wilfred Lewis

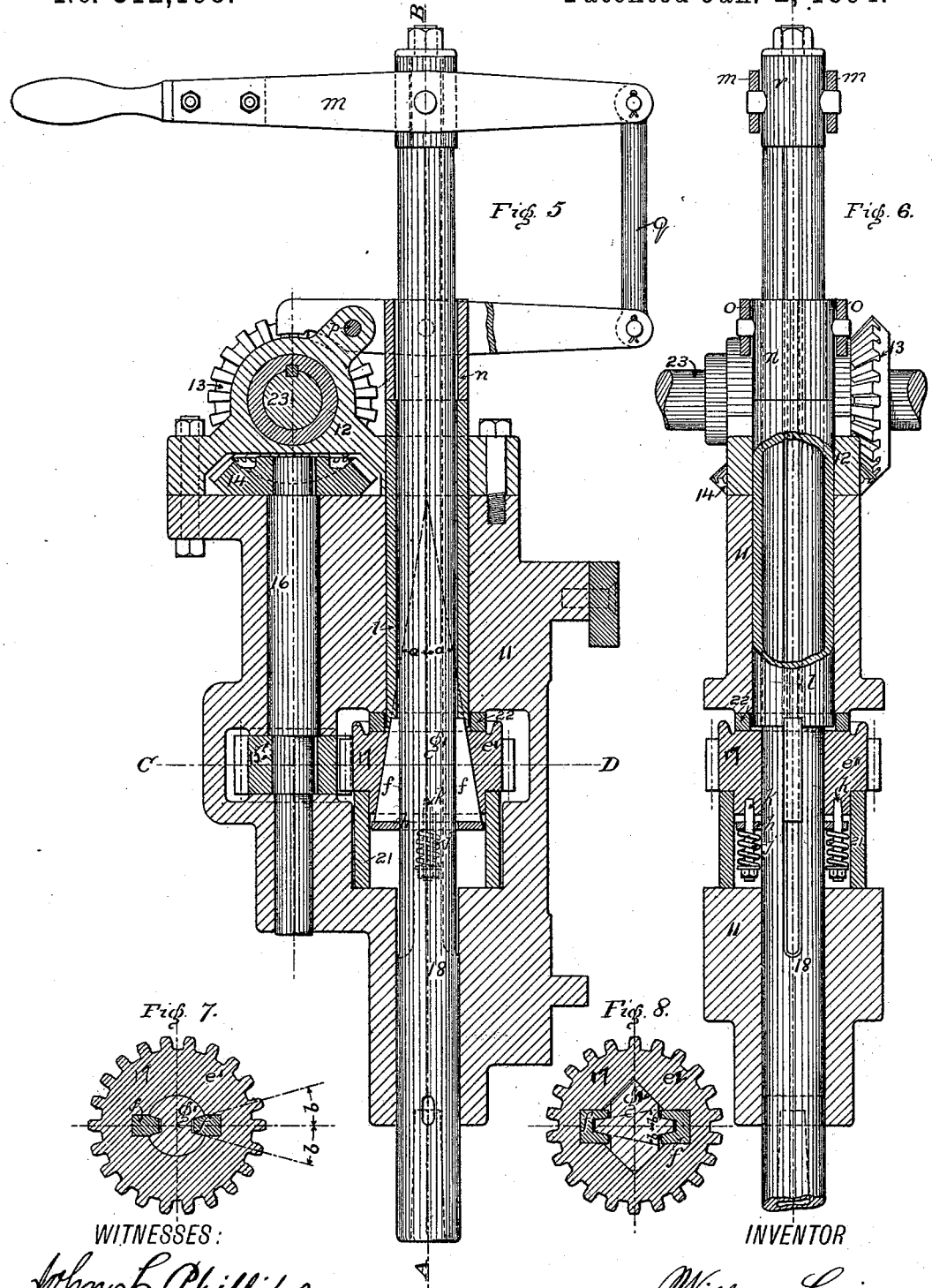

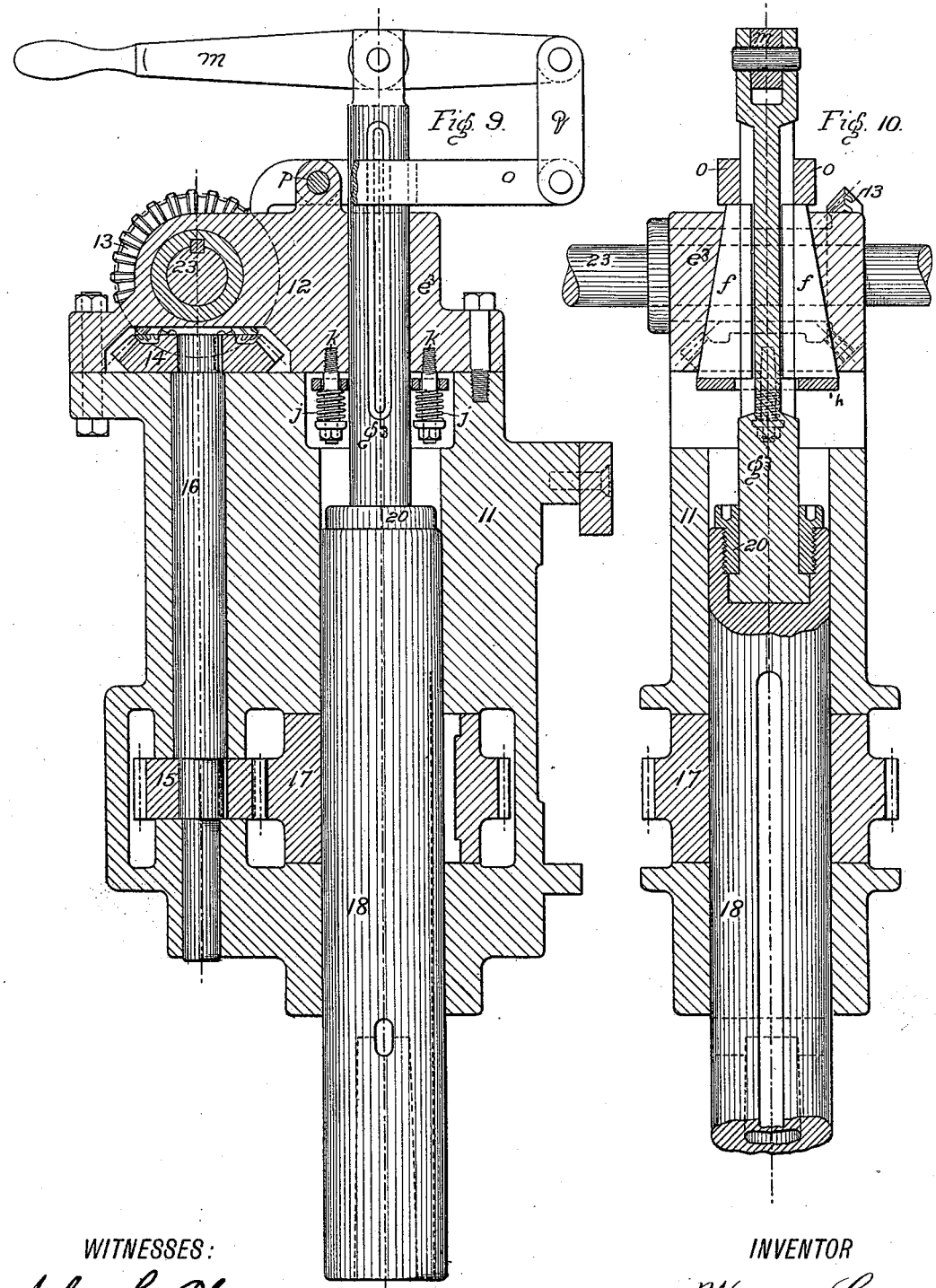

UNITED STATES PATENT OFFICE.

WILFRED LEWIS, OF PHILADELPHIA, PENNSYLVANIA, ASSIGNOR TO THE WILLIAM SELLERS & COMPANY, INCORPORATED, OF SAME PLACE.

HOLDFAST FOR DRILLING OR BORING MACHINES.

SPECIFICATION forming part of Letters Patent No. 512,198, dated January 2, 1894.

Application filed April 14, 1893. Serial No. 470,345. (No model.)

*To all whom it may concern:*

Be it known that I, WILFRED LEWIS, of the city and county of Philadelphia and State of Pennsylvania, have invented a new and useful Holdfast for Drilling or Boring Machines, of which the following is a specification.

My invention is applicable to all drilling or boring machines, but it is of more importance upon those for multiple drilling, in which a number of drills are assembled on the same crosshead and are fed together by the movement of the crosshead, or held by the crosshead while the work is pressed against them.

To avoid loss of time in multiple drilling, it is necessary, when the feed is engaged, that the drills should all begin to cut at the same time, and to accomplish this result it has heretofore been the practice to maintain the drills of a uniform length, as nearly as practicable, or to provide an independent screw adjustment for each spindle. Both methods are objectionable, the former for its cost and waste of material, and the latter for its waste of time. By the latter method, the drills can be accurately adjusted to commence work at the same time, but when a drill breaks or requires resharpening, the process of withdrawing and resetting by means of a screw is slow and tedious, and, in multiple drilling, the stoppage of a single drill has the same effect as stopping the whole gang.

To avoid these defects, it is one object of my invention to support the drill in any position along its axis, and to secure it automatically against the thrust due to its operation as a drill.

It is a further object of my invention to support the drill spindle automatically and to secure it in any axial position against the thrust of the drill and at the same time to permit a rapid adjustment by hand along its axis in either direction.

It is a further object of my invention, to adjust the axial position of the drill spindle by means of a hand lever.

To these ends, the nature of my invention consists, in a drill spindle fitted with engaging-wedges to grip an adjustable drill by friction surfaces proportioned to receive the wedges and cause them to tighten under the thrust of the drill.

It further consists in a wedge-block fitted with wedges and springs to grip a drill spindle or a bar stepped on the spindle by friction surfaces proportioned to receive the wedges and cause them to tighten under the thrust of the drill.

It further consists in a hand lever connected to the spindle or to the bar stepped thereon, and having for its fulcrum, a releasing lever which acts upon the engaging-wedges to release them when the hand lever is raised and against a positive stop when the hand lever is depressed.

Figure 1, Sheet 1, is a vertical section through the heads of a three spindle drilling machine, showing adjustable drills in the spindles. Fig. 2 is an enlarged sectional view of the drill and engaging wedges in connection with the spindle. Fig. 3 is a sectional view at right angles to Fig. 2. Fig. 4, is a section on the line A—B, Fig. 2, the spindle and drilling head being removed. Fig. 5, Sheet 2, is a vertical section of the head of a multiple drilling machine in the axis of a drill spindle, showing an adjustable spindle, wedge-block, wedges and connections to a controlling hand lever. Fig. 6 is a section through the drilling head in the axis of the drill spindle at right angles to Fig. 5 showing in full view, the spindle and an engaging-wedge. Fig. 7 is a section on the line C—D, Fig. 5, across the spindle, wedges and wedge-block. Fig. 8 is a section across the spindle of an alternate construction of the spindle and wedges. Fig. 9, Sheet 3, is a vertical section of the head of a multiple drilling machine, in the axis of a drill spindle, showing an alternate method of arranging the hold-fast with a bar stepped on the spindle. Fig. 10 is a vertical section of the same through the drilling head in the axis of the drill spindle at right angles to Fig. 9.

In all cases the hold-fast is essentially the same, whether applied directly to a drill, or, for additional advantages, to a spindle or bar stepped thereon, and, in its simplest form, it consists of a wedge-block, engaging-wedge, and grip-bar. These three essential elements may embrace different parts of the drilling head, as shown herewith, while the main purpose of the hold-fast and its principle of action remain the same.

In Figs. 1, 2, 3 and 4, the spindle acts as a wedge-block and the drill as the grip-bar to be adjusted in the spindle, both rotatable.

In Figs. 5 and 6, the driving wheel on the spindle acts as a wedge-block and the spindle as a grip-bar to be adjusted therein, both rotatable, while in Figs. 9 and 10, the wedge-block forms part of a stand bolted to the drilling head, with the grip-bar adjustable therethrough but neither rotatable, the latter carrying with it the spindle. In every case the grip-bar is adjustable in the wedge-block, and automatically secured thereto by the engaging-wedges, when pressure is applied as in drilling.

In Figs. 1, 2, 3 and 4, the hold-fast appears in its simplest form. The adjustment of the drill is effected in the spindle while the latter is held by collars in the drilling head.

9, 10 and 11, are the frames of the drilling heads for a three-spindle multiple drill, in which the spindles 18, 18, 18, are driven from a common driving shaft, not shown. To allow the spindles to be brought close together, the middle one is driven from above by bevel gears, and the side spindles by the shafts 16, 16, through the pinions 15 and 17.

$e$, is an enlargement of the lower end of the spindle 18, designated by its function as a wedge-block, to receive the engaging wedges $f, f$.

19, is an adjustable drill in the spindle, the shank $g$ of which, may be gripped and held by the wedges $f, f$, thus receiving the functional designation of "grip-bar."

$i$, is a nut screwed on the spindle by which the wedges $f, f$, may be brought in contact with the grip-bar and wedge-block. These wedges are held loosely by the washer $h$ on which they rest. The wedges $f, f$, engage the grip-bar $g$ in grooves which bind the wedges on their sides while clearance is provided at the bottom of the grooves. By this means, the friction between the wedges and the grip-bar, may be increased in such a ratio that when the grip-bar meets resistance in drilling, the wedges adhere to it and tighten against the wedge-block $e$, thus acting as a friction catch to prevent the grip-bar from slipping back. To insure this result, a certain relation must exist between the wedge angles $a, a$, and the groove angles $b, b$, for any assumed coefficient of friction. That is to say, when the angle $a$ is assumed, the angle $b$ must not exceed a certain amount depending upon the coefficient of friction. By reducing the angle $b$, the friction between the grip-bar and the wedges $f, f$, may be increased indefinitely and it is therefore obvious that a great variety of proportions between the angles $a$ and $b$ may be obtained, any one of which will be effective. There is, however, a choice in the selection of these angles when freedom of release is considered, for, if the angle $b$ is reduced indefinitely, the wedges $f, f$, may stick fast in the grooves of the grip-bar $g$, and as the angle $a$ is reduced, more and more force will be required to release the wedges from the wedge-block $e$.

In practice, it has therefore been found expedient to make the angle $a$ about ten degrees and the angle $b$ about fifteen degrees, as this combination has been found to hold firmly and release freely. It is not necessary that the nut $i$, should bring the wedges $f, f$, into action with great force, to secure the drill 19 in a given position in the spindle, because the wedges are tightened automatically by the thrust of the drill, and, in this respect, my present hold-fast differs from previous inventions designed to secure the drill by an initial clamping pressure. By this arrangement, the drill 19 may be quickly removed or adjusted to any position, but the special form of shank required may sometimes be objectionable or inconvenient, and, to accommodate drills of the usual form and secure the advantages of adjustment while the drills are in motion, the modifications shown in Figs. 5 and 6 and Figs. 9 and 10 are used.

Referring to Figs. 5, 6 and 7, 11 is the frame of a drilling head; 12, is a stand bolted to 11, to carry the driving bevel wheel 13; 14, is a bevel wheel driven by 13, and driving the pinion 15 on the shaft 16. 17, is a driving wheel on the spindle 18, which acts also as a wedge-block, $e'$, to receive the engaging wedges $f, f$. A portion, $g'$, of the spindle 18, is grooved to form a grip-bar for the engaging wedges $f, f$; $h$, is a washer stepped on the spindle and carried by the springs $j, j$, which are attached to the wedge-block $e'$, and $k, k$, are bolts supporting the springs $j, j$; 21, is a collar surrounding the springs and supporting the wedge-block $e'$. 22, is an opposing collar to take the thrust of the drill. $l$, is a bushing notched at one end to receive the wedges $f, f$, and serving as a connection through which the wedges can be released by the hand lever $m$. $n$, is a sleeve with trunnions resting on the bushing $l$, and carrying the two part releasing lever O which is also pivoted to 12 by the pin P, and connected by the link $q$ with the hand lever $m$. The movement of this lever is limited in one direction by a positive stop, and in the other direction by the wedges $f, f$, which form a yielding abutment. $r$, is a sleeve with trunnions, by which the hand lever $m$ is connected with the spindle 18. 23, is the driving shaft by which one or more drills may be driven. Here the initial grip of the wedges $f, f$, is effected by the springs $j, j$, which need only be strong enough to support the weight of the spindle and the parts attached by friction. The grip-bar $g'$ is similar in section to the shank of the drill shown in Fig. 4, but its position is under more constant and perfect control by means of the hand lever and connections as shown. It is not necessary to the successful operation of my invention, that the grip-bar $g$ or $g'$ should be grooved on opposite sides for the reception of two wedges, as shown, because a groove on one side only with a suitable wedge can be made effective. In such case, however, the angle $a$ should be greater and the angle $b$ less than the approximate values just given, but the double wedges as shown are preferable. Neither is it necessary that the grip-bar $g'$ should be grooved to receive the wedges $f, f$, for, as shown in Fig. 8, the wedges may be grooved to receive the grip-bar $g^2$. This is an alternate construction, which I contemplate applying in certain special cases, but in general the round bar with the grooves is preferable.

In Figs. 4 and 7, the wedges $f f$, serve the double purpose of holding the grip-bar against the thrust of the drill, and of forcing it to rotate at the same time, thus economizing space without affecting the action of the hold-fast.

In Fig. 8, the wedges may be fitted to drive the grip-bar, or the corners of the shaft may serve that purpose while the wedges act only to hold the bar longitudinally.

Having shown that the hold-fast can be made to act as a positive stop against which the thrust of the drill may be taken without danger of slipping, the adjustment of the drill by means of a hand lever will depend upon the release of the engaging wedges $f, f$. These are pressed into the grooves in the grip-bar by the springs $j, j$, with sufficient force to sustain the spindle and parts carried thereon by friction, and when the hand lever is pressed down, the grip-bar is simply forced to slip on the wedges in a direction which releases their grip. When the handle is raised however, it is necessary to release the automatic engagement of the wedges, and, to effect this result, the reaction of the hand lever $m$ is transmitted through the link $q$ and releasing lever O, to the wedges $f, f$, and springs $j, j$, which form a yielding abutment against which the hand lever ultimately acts in its effort to raise the spindle. In this way, the wedges $f, f$, are pushed down and partially or wholly released while the grip-bar is raised. Whether partially or wholly released will depend upon the weight to be raised, the leverage employed, and the strength of the abutment springs $j, j$. Considerable latitude in this respect may be tolerated with success, the proportions depending only upon the freedom of movement desired. When the hand lever is depressed, the lever O does not react upon the wedges $f, f$, but forms through its fulcrum pin P, and projecting end, a fixed abutment against which the force on the hand lever may be exerted through the link $q$. The spindle 18, is thus under the immediate control of the hand lever $m$, while at the same time ready to receive and sustain, without danger of slipping, any thrust that may come upon it from the drill.

As the function of the springs $j, j$, is to seize the grip-bar with a certain initial pressure sufficient to sustain the weight to be carried, the same result can be effected by a counterweighted lever pressing against the wedges $f, f$, and further if the drilling head were inverted for overhead work, no spring or counterweight would be required to engage the wedges because gravity would then keep them in contact with the wedge-block and grip-bar.

In Figs. 9 and 10, 11 is the drilling head; 12, a stand bolted thereto which carries the driving bevel wheel 13 and forms at $e^3$ a wedge-block to receive the engaging wedges $f, f$. 14, is a bevel wheel driven by 13, and driving the pinion 15 on the shaft 16. 17, is a driving wheel on the spindle 18. The grip-bar $g^3$ is stepped on the spindle 18 and held in place by the nut 20. $h$ is a washer supporting the wedges $f, f$, and carried by the supporting springs $j, j$, and bolts $k, k$. $m$, is a hand lever pivoted on the grip-bar $g^3$ and coupled by the link $q$ to the two-part lever O which rests upon the wedges $f, f$, and is pivoted at $p$ to the stand 12. 23, is a shaft by which a number of spindles may be driven.

In Figs. 9, and 10, the hand lever $m$ is pivoted directly on the grip-bar $g^3$ and the releasing lever O acts directly against the wedges $f, f$, thus dispensing with the trunnion sleeves $r$ and $n$ and the notched bushing $l$. Shown in Figs. 5 and 6. The hold-fast and adjusting hand lever, act in the same manner as already described for Figs. 5, 6 and 7, and one or the other of these constructions will be preferred according to circumstances. Thus, by means of the hold-fast, drills of different lengths may be used without inconvenience, and when a drill breaks or becomes unfit for service, the spindle may be retracted, a new drill inserted and put to work with the least possible delay.

Having now described my invention, what I claim as new, and desire to secure by Letters Patent, is—

1. In a drilling or boring machine, a wedge-block with one or more engaging wedges seated therein, and an adjustable grip-bar with friction surfaces proportioned to receive the wedges and cause them to tighten automatically under the end thrust of drilling or boring.

2. In a drilling or boring machine, the combination of a wedge-block one or more engaging wedges, means for actuating said wedges and an adjustable grip-bar having friction surfaces proportioned to receive the wedges and cause them to tighten automatically under the end thrust of drilling or boring.

3. In a drilling or boring machine, a wedge-block one or more engaging wedges means for actuating said wedges and an adjustable grip-bar, in combination with a releasing lever to release the engaging-wedges while the grip-bar is retracted.

4. In a drilling or boring machine, a wedge-block, one or more engaging-wedges and an adjustable grip-bar, in combination with a hand lever connected to the grip-bar, the fulcrum of which lever, moves the engaging wedges, in the opposite direction to the movement of the grip bar, when this bar is retracted, but is fixed as to the longitudinal movement of the grip bar, when this bar is advanced, substantially as and for the purposes set forth.

WILFRED LEWIS.

Witnesses:
JOHN L. PHILLIPS,
F. M. HUTCHINSON.